July 29, 1941.  H. R. LEGATSKI  2,250,716
PROCESS OF SEPARATING VAPORS
Filed Nov. 15, 1938
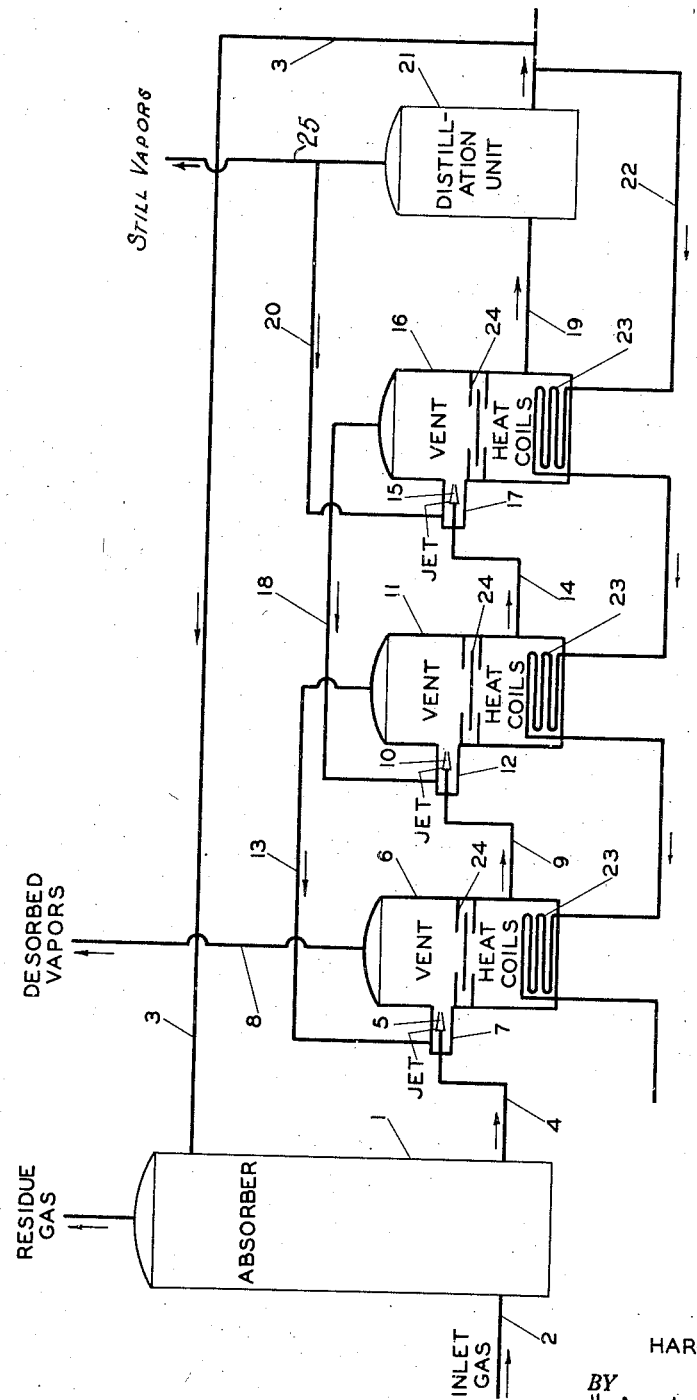
INVENTOR.
HAROLD R. LEGATSKI
BY
ATTORNEYS.

Patented July 29, 1941

2,250,716

UNITED STATES PATENT OFFICE 2,250,716

PROCESS OF SEPARATING VAPORS

Harold R. Legatski, Bartlesville, Okla., assignor to Phillips Petroleum Company, a corporation of Delaware Application November 15, 1938, Serial No. 240,592

5 Claims. (Cl. 196—8)

This invention relates to the separation of vapors and gases from solutions and mixtures, and more particularly to a novel method for removing methane from high pressure, rich absorption oil.

In the usual oil absorption gasoline recovery system, the gas containing the hydrocarbon vapors is introduced into an absorber where it contacts an absorbent oil and the vapors become absorbed by said oil. The rich absorption oil is then passed through suitable distillation equipment for the separation of the absorbed hydrocarbons from the absorption oil. The portions distilled off include gasoline and other vapors which may be condensed, and gases which may be permitted to escape or may be collected and used for heating or like purposes.

It is well known that methane is objectionable in gasoline and in mixtures of hydrocarbon gases such as polymerization feed. Under the processes heretofore practiced, it has been practically impossible to prevent the absorption and retention in the absorbent of a certain amount of methane. Further, in cracking and cracking-polymerization processes it is desirable to remove methane and hydrogen from the treated materials. The same applies to the removal of hydrogen sulfide or any other undesirable fixed gas or very volatile vapor from a solution or mixture of gas or vapors. Thus, a primary object of the present invention is to provide an improved process for removing a very volatile or "fixed" gas component from a solution or from a mixture of gases or vapors.

A further disadvantage of the absorption system heretofore in use is the loss of a considerable quantity of heavier gaseous hydrocarbons such as ethane, propane and butane although these hydrocarbons are of commercial value. Thus, a further object of the present invention is to provide an improved method for retaining ethane and heavier gases in the rich absorption oil for subsequent recovery.

A still further object of the present invention is to prepare a feed for polymerization in which the methane contained in the original hydrocarbon gases is removed.

The present invention contemplates the removal of methane from high pressure, rich absorption oil by countercurrently contacting said oil in a plurality of stages at successively lower pressures with vapors derived from said oil by decrease in pressure. Energy available in the high pressure oil and in dissolved methane which is to be discarded at a pressure less than absorber pressure is used to compress said vapors and contact vapors and oil.

Thus additional objects of the present invention are the utilization of energy in the high pressure oil and waste methane and the promotion of the distillation of the rich oil which is due to the fact that while absorption is promoted by high pressure, distillation is promoted by low pressure.

Other objects and advantages will appear from the more detailed description of the invention following hereinafter, taken in conjunction with the accompanying drawing, which is a diagrammatic elevation of an apparatus suitable for carrying out the present invention.

In the drawing, 1 denotes an absorber having a rich gas inlet line 2 near the bottom thereof. This gas, coming from any suitable source, is under considerable pressure either as a result of the natural pressure within the gas or induced therein by a compressor. The absorption medium is introduced into the absorber through a line 3 near the top of the absorber and comprises denuded oil from the still. As a result of the high pressure of the gas, the absorption in absorber 1 is promoted to a high degree. The rich absorption oil under considerable pressure is run out of absorber 1 through a line 4 and passes through a jet 5 into a vent tank 6 through an inlet 7 surrounding the jet 5. A vapor outlet 8 is provided at the upper end of the vent tank 6 for a purpose to be explained later.

Leaving the lower end of tank 6, through a line 9, the rich oil, at a slightly reduced pressure, is passed through a jet 10 into a second vent tank 11 through an inlet 12 surrounding the jet 10. A vapor line 13 extends from the upper end of tank 11 and is shown connected to the inlet 7 of tank 6 in such a way that the vapor or gas that is liberated in tank 11 as will later appear, is injected into the inlet 7 and will thereby aid the operation of the jet 5 through which oil is injected into tank 6 from the absorber 1.

The rich oil in tank 11 is run out through a line 14, through a jet 15 and into a third vent tank 16 by way of an inlet 17 surrounding the jet 15. The pressure in tank 16 is reduced from that in tank 11. A vapor line 18 connects the upper end of tank 16 to inlet 12 of tank 11 in the same manner as line 13 is connected to inlet 7.

The rich oil from tank 16 is passed into a distillation unit 21 through pipe 19. The rich oil is subjected to heat in distillation unit 21 to denude the same. The evolved vapors are passed through pipe 25 for further processing to recover natural gasoline and kindred products. A line 20 connects inlet 17 to the pipe 25 similarly to the connections of the other vapor lines to their corresponding inlets, for returning vapors or gases from the distillation unit to the system. Denuded oil from the still may be passed through pipe 22 to heat exchanger 23. Baffles 24 are shown in the vent tanks.

In explanation of the flow sheet described above, rich oil from absorber 1 at pressure $P_1$, greater than pressure $P_2$ on vent tank 6, is used to inject vapors at inlet 7, which vapors are evolved in vent tank 11 at a pressure $P_3$ which is less than pressure $P_2$. Simultaneous with and incidental to this operation is an intimate contacting of vapors from vent tank 11 and rich oil from absorber 1 in vent tank 6. Proceeding, rich oil from vent tank 6 at pressure $P_2$, greater than pressure $P_3$ on vent tank 11 is used to inject vapors at inlet 10, which vapors are evolved in vent tank 16 at pressure $P_4$ which is less than pressure $P_3$. This injecting operation involves an intimate contacting of vapor and oil in vent tank 11 similarly to the corresponding operation in vent tank 6. Proceeding further, rich oil from vent tank 11 at pressure $P_3$, greater than pressure $P_4$ on vent tank 16 is used to inject vapors at inlet 15, which vapors are evolved in distillation unit 21 at pressure $P_5$ which is less than pressure $P_4$. This jetting operation provides an intimate contacting of vapor and oil in vent tank 16.

This type of operation, insofar as pressure reduction steps are concerned, depends only on the original pressure available and final pressure desired. The number of stages possible will be affected by the volume of oil, volumes of vented vapor at any stage and the pressure drop available. It will be noted that both energy stored in high pressure oil and energy stored in dissolved gases in the oil are utilized in this process.

As can be seen from the drawing, the entire apparatus will amount to a pressure gradient fractionating device for removal of methane from rich oil by solution of hydrocarbons heavier than methane in the oil. The methane to be discarded finally leaves the system at the highest vent pressure $P_2$ from outlet pipe 8 in vent tank 6. Still vapors, which are methane free, enter the last venting stage, shown as vent tank 16, through vapor line 20. Oil, methane free and at low pressure is removed from vent tank 16 and distilled in 21 to remove ethane and heavier absorbed hydrocarbons.

Though not apparent from the drawing, it will be seen that as the vapor progresses through this system, varying concentrations of components will be encountered. These vapors, depending upon their economic value in commercial processes, may be removed at various stages without in any way having a deleterious effect upon the process.

The flow sheet is intended to be diagrammatic only, in order that the essential parts of the process will stand out. Such items as valves and pressure and level controllers are known to the art and have therefore not been shown. However the unit may be constructed or controlled, the basic idea as here presented will remain the same.

Included in the possible operation of the process, is the addition of heat to the oil or vapor at any point in the process by heat exchangers such as those shown at 23, either for the purpose of increasing available energy from vented vapors or for the purpose of removing heat from lean oil leaving the still by heat exchange with rich oil going to the still.

It is readily apparent that the entire unit disclosed may be built into an existing plant without interfering with present heat exchange or distillation equipment. A low pressure plant may be converted to high pressure operation for the production of ethane and heavier hydrocarbons by use of this process to remove methane from the rich oil before it reaches the still.

Other advantages of the present system over known methods are as follows: venting of rich oil is so controlled that the waste methane is disposed of at a high pressure close to absorber pressure; venting of the rich oil is so controlled that the ethane and heavier hydrocarbons absorbed are retained in the oil for removal either at the distillation unit or in a later stage of the process than the stage of methane removal; since methane is removed from the rich oil, it will be possible to condense the plant product at lower pressure and to conduct the oil distillation at a lower pressure and cost.

Modification and variations of the present disclosure will be apparent to those skilled in the art, and therefore I do not wish to be limited precisely to the construction herein shown except as may be required by the appended claims considered wtih reference to the prior art.

Having thus described the invention, what is claimed is:

1. The process of separating highly volatile vapors from a solution under high pressure comprising contacting said solution in a plurality of stages at successively lower pressures with vapors liberated from said solution in subsequent stages and utilizing the pressure drop of said solution passing from stage to stage to move the vapors from stage to stage in the opposite direction.

2. The process of separating highly volatile vapors from a solution under high pressure comprising, contacting said solution in a plurality of stages at successively lower pressures with vapors liberated from said solution in subsequent stages, and causing solution at higher pressure, passing from stage to stage, to inject vapors passing in the opposite direction from stage to stage.

3. The process of separating highly volatile vapors from a solution under high pressure comprising, contacting said solution in a plurality of stages at successively lower pressure with vapors liberated from said solution in subsequent stages, causing solution at higher pressure, passing from stage to stage, to inject vapors passing in the opposite direction from stage to stage, and removing the most volatile vapor from the highest pressure stage.

4. The process of demethanizing high pressure, rich absorbent containing methane and higher boiling absorbed hydrocarbons and recovering said higher boiling hydrocarbons comprising, contacting said absorbent in a plurality of stages at successively lower pressures with vapors liberated from said absorbent in subsequent stages, causing absorbent at higher pressure, passing from stage to stage, to inject vapors passing in the opposite direction from stage to stage, removing methane from the highest pressure stage, and distilling rich absorbent free of methane to recover the higher boiling hydrocarbons from the absorbent.

5. The process of demethanizing high pressure, rich absorption oil containing methane and higher boiling absorbed hydrocarbons and recovering said higher boiling hydrocarbons comprising, contacting said oil in a plurality of stages at successively lower pressures with vapors liberated from said oil in subsequent stages, causing oil at higher pressure, passing from stage to stage, to inject vapors passing in the opposite direction from stage to stage, removing methane from the highest pressure stage, distilling rich absorbent free of methane to recover the higher boiling hydrocarbons from the absorbent, and returning some of the vapors from the distillation step to the lowest pressure stage.

HAROLD R. LEGATSKI.